United States Patent [19]
Block et al.

[11] Patent Number: 5,194,480
[45] Date of Patent: Mar. 16, 1993

[54] THERMALLY CONDUCTIVE ELASTOMER

[75] Inventors: Jacob Block, Rockville, Md.; Roy W. Rice, Alexandria, Va.; Charles R. Morgan, Brookeville, Md.

[73] Assignee: W. R. Grace & Co.-Conn., New York, N.Y.

[21] Appl. No.: 705,482

[22] Filed: May 24, 1991

[51] Int. Cl.$^5$ .......................... C08K 3/38; C08K 3/28; C08K 3/22
[52] U.S. Cl. .................................. 524/404; 524/428; 524/430; 524/433
[58] Field of Search ................ 524/404, 428, 430, 433

[56] References Cited

U.S. PATENT DOCUMENTS

| | | | |
|---|---|---|---|
| 4,292,225 | 9/1981 | Theodore et al. | 524/404 |
| 4,544,696 | 10/1985 | Streusand et al. | 524/428 |
| 4,604,424 | 8/1986 | Cole et al. | 524/433 |
| 4,978,714 | 12/1990 | Bayan et al. | 525/96 |
| 5,011,870 | 4/1991 | Peterson | 524/428 |
| 5,011,872 | 4/1991 | Latham et al. | 524/404 |
| 5,021,494 | 6/1991 | Toya | 524/433 |

FOREIGN PATENT DOCUMENTS

| | | | |
|---|---|---|---|
| 62-154410 | 7/1987 | Japan | 524/404 |
| 63-307748 | 12/1988 | Japan | 524/428 |
| 56145605 | 11/1991 | Japan | 524/404 |

OTHER PUBLICATIONS

"Kraton ® Thermoplastic Rubber," Shell Chemical Company, 1988.
"Kraton ® GX1657 Thermoplastic Rubber," Technical Bulletin, Shell Chemical Company, Mar. 1989.
"Crosslinking Kraton ® FG1901X Rubber with Cymel 303", Technical Bulletin, Shell Chemical Company, Oct. 1988.
"Cho-Therm ® Thermal Interface Materials," Chomerics, Inc. 1988.

*Primary Examiner*—Paul R. Michl
*Assistant Examiner*—Toe H. Yoon
*Attorney, Agent, or Firm*—Steven Capella

[57] ABSTRACT

Thermoplastic rubber is used as part of a thermally conductive electrically insulating filled elastomer composition. The filler may be any conventional filler such as hexagonal boron nitride or alumina. The thermoplastic rubber may be crosslinked. The filled elastomer can be molded or pressed into desired shapes.

5 Claims, No Drawings

THERMALLY CONDUCTIVE ELASTOMER

BACKGROUND OF THE INVENTION

Thermally conductive elastomers are elastomeric materials which contain a thermally conductive filler. They are primarily used in electronics applications in instances where good thermal conduction and electrical insulation are needed in the same material. For example, a thermally conductive elastomer may be used as an interface between a semiconductor electronic component and a metal heat sink.

Many electronic designs and applications are linked by the ability to dissipate ohmic heat generated during the operation of the electronics. Many electronic components, especially semiconductor components, are prone to breakdown at high temperatures. Thus, the ability to dissipate heat is a limiting factor on the performance of the electronic component.

Since high thermal conductivity metal heat sinks, because of their high electrical conductivity, cannot be directly contacted with electronic components, thermally conductive elastomer material is used as a thermally conductive, electrically insulating interface between the electronic component and the metal heat sink. The thermal conductivity of thermally conductive elastomers is generally much less than that of the metal heat sink. Thus, the thermal conductivity of the thermally conductive elastomer limits the overall ability to dissipate ohmic heat.

Typical thermally conductive elastomers contain a ceramic filler such as boron nitride or alumina in an elastomer matrix. The elastomers used are usually urethane or silicone based. While these materials are adequate in many instances, there is a constant demand for thermally conductive elastomers with improved thermal conductivity and electrical insulating properties.

SUMMARY OF THE INVENTION

The invention provides thermally conductive electrically insulating filled elastomers with improved thermal conductivity and methods of making improved thermally conductive filled elastomers.

In one aspect, the invention encompasses a thermally conductive electrically insulating filled elastomer composition comprising:
a) an elastomer material, and
b) thermally conductive electrically insulating filler particles.

In a further aspect, the invention encompasses a thermally conductive electrically insulating filled elastomer comprising a thermoplastic elastomer and filler wherein the filler forms at least about 45-70 vol. % of the composition.

The invention also embraces a method of making thermally conductive electrically insulating filled elastomer compositions, the method comprising:
a) dissolving elastomer material in a solvent to form a solution;
b) combining the solution and the thermally conductive electrically insulating filler to form a mixture; and
c) drying the mixture.

The elastomers are preferably thermoplastic elastomers. The elastomer may be a crosslinkable elastomer. The crosslinkable elastomer may be crosslinked by using an appropriate crosslinking agent, catalyst and temperature during formation of the composition. The filled elastomer may be shaped using casting, pressing or other techniques.

DETAILED DESCRIPTION OF THE INVENTION

The thermally conductive electrically insulating filled elastomers of the invention all contain a thermally conductive filler and a thermoplastic elastomer. The elastomer may optionally be a crosslinkable elastomer.

The thermally conductive electrical insulating filler may be any conventional filler such as boron nitride, alumina, magnesia or aluminum nitride. Hexagonal boron nitride is a preferred filler. The proportion of filler in the composition is preferably about 45-70 vol. %. For BN fillers, the filler preferably forms about 65-80 wt. % of the composition. Any conventional particle size may be used. Preferably, the filler particle size is about 5-200 $\mu$. Preferably, the filler contains a mixture of coarse (100-200 $\mu$) and fine (10-50 $\mu$) particle sizes. High bulk density fillers generally provide better thermal conductivity. For alumina fillers, any conventional $\alpha$-alumina can be used, however tabular alumina is preferred.

The elastomer may be any thermoplastic elastomer, preferably a block copolymer. Preferred block copolymers are styrenic copolymers and olefin copolymers. Particularly preferred are styrene-ethylene-butylenestyrene block copolymers. Examples of these block copolymer elastomers are Kraton ® G-1652-M and Kraton ® G-657-MX sold by the Shell Chemical Co. These Kraton ® elastomers have styrene/rubber ratios of 29/71 and 13/87 respectively.

If desired, a crosslinkable elastomer such as Shell Chemical's Kraton ® 1901-X or RP-6501 may be used as the elastomer. Crosslinkable elastomers have functional groups such as carboxyl groups or ethoxy silanol groups which are reacted to crosslink the elastomer molecules. Any suitable crosslinking agent and a crosslinking catalyst may be combined with the crosslinkable elastomer to bring about the crosslinking. Cymel ® 303 (hexamethoxymethylmelamine) sold by American Cyanamid Co. is a preferred crosslinking agent for Kraton ® 1901-X. Cycat ® 600 (aromatic sulfonic acid) sold by American Cyanamid Co. is a preferred crosslinking catalyst for Kraton ® 1901-X. Dibutyl tin dilaurate is a preferred crosslinking catalyst for Kraton ® RP-6501. The relative proportions of crosslinkable elastomer, crosslinking agent and crosslinking catalyst may vary depending on the compounds used and the degree of crosslinking desired.

For hexagonal boron nitride fillers, the filled elastomers of the invention preferably have a thermal conductivity of at least about $12 \times 10^{-3}$ cal/sec-cm-K, more preferably at least about $15 \times 10^{-3}$ cal/sec-cm-K. The filled elastomers of the invention may be made in any conventional form such as blocks, sheets or films using any conventional method.

A preferred method for making the filled elastomers of the invention employs a solvent-containing precursor composition. The elastomer is dissolved in an appropriate solvent to form a solution. The amount of solvent can be any amount which effectively dissolves all the elastomer. Typically, the solvent forms about 50-85 wt. % of the elastomer-solvent solution. The thermally conductive filler is then added to form the precursor composition. The composition is dried to remove the solvent. The composition is preferably shaped before and/or after the drying step.

Before drying, the composition may be cast in a mold or as a film or sheet. After drying, the composition is preferably pressed at elevated temperatures. The drying temperature may vary depending on the solvent and elastomer involved as well as the drying time. The drying is preferably performed for about an hour at about 70°-120° C. The pressing is preferably performed at 500-10,000 psi, more preferably about 1,500 psi. The pressing temperature is preferably about 150°-175° C.

If a crosslinkable elastomer is used, a crosslinking agent and catalyst would preferably be added to the precursor mixture. The materials used in the process of the invention are those discussed with respect to the elastomer product above. The solvent may be any suitable solvent. Toluene is a preferred solvent. The amount of solvent used is preferably the minimum needed to form a workable precursor composition.

The invention is further illustrated by the following examples. The invention is not limited to the materials process conditions or properties recited in these examples.

EXAMPLE 1

This example illustrates the preparation of a thermally conductive elastomer using hexagonal BN and a thermoplastic rubber.

Kraton ® G-1652-M thermoplastic rubber (obtained from Shell Chemical Co) (2.5 g) was dissolved in 7.0 g toluene. (Kraton ® G-1652-M is a styrene-ethylene-butylene-styrene block copolymer, having a styrene to rubber ratio of 29/71.) Hexagonal boron nitride (7.5 g coarse) was added to the above solution and mixed well. The mixture was dried in a 120° C. oven (1 hour). The dried mix was then pressed between two steel platens at 165° C. and 8,000 pounds of force. The thermal conductivity of the resultant BN-filled elastomer was determined by measuring the temperature difference between two aluminum plates, one of which is heated. The value obtained was $15.3 \times 10^{-3}$ cal/sec-cm-K. This value compares very favorably to a similarly prepared BN composite made with a silicone rubber which had a value $10 \times 10^{-3}$ cal/sec-cm-K.

EXAMPLE 2

This example shows that other thermoplastic rubbers can be used to make the thermally conductive elastomer.

The experiment described in Example 1 was repeated with Kraton ® G-1657-MX (Shell Chemical Co.) substituted for the Kraton ® G-1652-M used in Example 1. (Kraton ® G-1657-MX is a styrene-ethylene-butylene-styrene block copolymer having a styrene to rubber ratio of 13/87, and also containing 35% styrene-ethylene-propylene block copolymer.) The thermal conductivity obtained for this material was $15.8 \times 10^{-3}$ cal/sec-cm-K, which again compares favorably with $10 \times 10^{-3}$ cal/sec-cm-K for a composite similarly prepared with silicone rubber.

EXAMPLE 3

The experiment described in Example 2 was repeated, but instead of 100% coarse BN, a mixture of 75% coarse BN and 5% fine BN was used. The thermal conductivity of the resultant product was $17.3 \times 10^{-3}$ cal/sec-cm-K, which is slightly better than the value obtained with 100% coarse BN ($15.8 \times 10^{-3}$ cal/sec-cm-K).

EXAMPLE 4

This example shows that high concentrations of BN can be obtained in a thermoplastic rubber.

The experiment described in Example 1 was repeated, with the exception that 1.5 g of Kraton ® G-1652-M rubber were used and 8.5 g of the mixed BN of Example 3 were used. The thermal conductivity of the resultant materials was $16.8 \times 10^{-3}$ cal/sec-cm-K. Concentrations this high in BN cannot be prepared with silicone rubber, i.e., the product is too powdery.

EXAMPLE 5

This example shows that α-alumina can be used as a thermally conductive filler.

A solution of Kraton ® 1657-MX in toluene was prepared by dissolving 10.0 g Kraton ® 1657-MX in 40.0 g toluene. Tabular α-alumina (Alcoa) was added (23.3 g) followed by 5.0 g isopropanol. After mixing, air was removed by vacuum, and the mixture was cast on a Teflon ® sheet with a doctor blade set at 100 mils. After air drying for 1 hour, the product was oven dried at 70° C. for 1 hour. The resultant sheet was pressed at 20,000 lb at 325° F. for 5 minutes. The thermal conductivity was determined and was found to be $2.1 \times 10^{-}$cal/sec-cm-K, which compares favorably with a similarly prepared product made in silicone rubber, $1.7 \times 10^{-3}$ cal/sec-cm-K.

EXAMPLE 6

This example shows that a cross-linkable Kraton ® rubber can be used as the thermoplastic rubber.

A dispersion containing 9.72 g Kraton ®-1901-X (COOH terminated), 0.25 g Cymel ® 303, and 0.03 g Cycat ® 600 in 31.5 toluene and 3.5 g isopropanol was prepared. 30 g BN (a mixture of 70/30 coarse and fine) were added. Air was removed by vacuum, and a sheet was prepared as in Example 5. The thermal conductivity was determined and was found to be $13.4 \times 10^{-3}$ cal/sec-cm-K, which compares favorably to similarly prepared composites in a silicone rubber ($9.5 \times 10^{-3}$ cal/sec-cm-K).

EXAMPLE 7

The experiment of Example 6 was repeated, with the exception that Kraton ® RP 6501, (ethoxysilane terminated) was substituted for Kraton ® 1901-X, and 0.05 g dibutyltin dilaurate was substituted for the Cymel and Cycat. The product had a thermal conductivity of $12.8 \times 10^{-3}$ cal/sec-cm-K, which compares favorably with a similarly prepared silicone product ($9.5 \times 10^{-3}$ cal/sec-cm-K).

What is claimed is:

1. A thermally conductive electrically insulating filled elastomer composition comprising:
    a) a styrene-ethylene-butylene-styrene block copolymer thermoplastic elastomer, and
    b) about 45-70 vol. % thermally conductive electrically insulating filler particles.

2. The composition of claim 1 wherein said filler includes particles of material selected from the group consisting of hexagonal boron nitride, α-alumina, magnesia and aluminum nitride.

3. The composition of claim 1 wherein said elastomer is crosslinkable thermoplastic elastomer.

4. The composition of claim 3 further comprising a crosslinking agent and catalyst for crosslinking said elastomer.

5. The composition of claim 2 wherein said filler is boron nitride which forms about 65-80 wt. % of said composition.

* * * * *